US012540870B2

(12) United States Patent
Severac (10) Patent No.: US 12,540,870 B2
(45) Date of Patent: Feb. 3, 2026

(54) MICROSENSOR WITH INTERDIGITATED ELECTRODES (71) Applicant: NANOMADE LAB, Toulouse (FR)

(72) Inventor: Fabrice Severac, Toulouse (FR)

(73) Assignee: NANOMADE LAB, Toulouse (FR)

( * ) Notice: Subject to any disclaimer, the term of this patent is extended or adjusted under 35 U.S.C. 154(b) by 0 days.

(21) Appl. No.: 18/832,911

(22) PCT Filed: Dec. 17, 2022

(86) PCT No.: PCT/EP2022/086523
§ 371 (c)(1),
(2) Date: Jul. 25, 2024

(87) PCT Pub. No.: WO2023/111344
PCT Pub. Date: Jun. 22, 2023

(65) Prior Publication Data
US 2025/0164326 A1 May 22, 2025

(30) Foreign Application Priority Data
Dec. 17, 2021 (FR) ........................... 2113933

(51) Int. Cl.
*G01L 1/20* (2006.01)
*G01B 7/16* (2006.01)
(Continued)

(52) U.S. Cl.
CPC ............... *G01L 1/205* (2013.01); *G01B 7/18* (2013.01); *H03K 17/9647* (2013.01); *B82Y 15/00* (2013.01); *B82Y 30/00* (2013.01)

(58) Field of Classification Search
CPC ..... H01H 2201/036; B81B 3/007; G01L 1/16; G01L 1/205; G01L 1/22; G01L 1/2293;
(Continued)

(56) References Cited

U.S. PATENT DOCUMENTS 6,532,824 B1 3/2003 Ueno
8,104,358 B1 * 1/2012 Jia ........................ G01L 9/0072
73/780

(Continued)

FOREIGN PATENT DOCUMENTS

CN 103943772 A * 7/2014
EP 1113252 A1 7/2001
WO 2014016429 A1 1/2014

OTHER PUBLICATIONS

English Translation of CN 103943772 (Year: 2014).*
(Continued)

*Primary Examiner* — Tran M. Tran
(74) *Attorney, Agent, or Firm* — PATLOCK LLC; Jean C Hamann (57) ABSTRACT

The invention pertains to a microsensor (210, 310, 410) comprising a first electrode (211, 311, 411) and a second electrode (212, 312, 412), each electrode comprising a plurality of parallel tracks (222, 322, 422), each track comprising a connected end and a free end, each track extending from a strip (223, 323, 423), the strip connecting the tracks at their connected ends, the tracks of the two electrodes being offset and in mirror symmetry so that the tracks of the two electrodes are interdigitated and comprise between each pair of interdigitated tracks an assembly of nanoparticles (430) in a ligand, wherein each track (222, 322, 422) extending from the strip (223, 323, 423) comprises at least one change of direction.

3 Claims, 6 Drawing Sheets (51) Int. Cl.
*H03K 17/96* (2006.01)
*B82Y 15/00* (2011.01)
*B82Y 30/00* (2011.01)

(58) Field of Classification Search
CPC .. G01L 1/2287; G01L 1/14–148; H01G 4/242
See application file for complete search history.

(56) References Cited

U.S. PATENT DOCUMENTS

| | | | |
|---|---|---|---|
| 9,134,211 B2* | 9/2015 | Cho | G01B 7/18 |
| 9,574,955 B2* | 2/2017 | Iwase | G01L 1/205 |
| 9,652,101 B2* | 5/2017 | McMillen | G06F 3/045 |
| 9,959,004 B2* | 5/2018 | Lång | G01L 5/0038 |
| 10,268,315 B2* | 4/2019 | McMillen | G06F 3/0418 |
| 10,444,094 B1* | 10/2019 | Ocampo | G01L 1/2287 |
| 11,366,029 B2* | 6/2022 | Severac | B82Y 30/00 |
| 12,056,305 B2* | 8/2024 | Hong | G06F 3/04146 |
| 12,085,461 B2* | 9/2024 | Burghoorn | G01L 1/2287 |
| 12,220,227 B2* | 2/2025 | Carbo, Jr. | H05K 1/0283 |
| 12,287,932 B2* | 4/2025 | Severac | G01L 5/228 |
| 12,306,052 B2* | 5/2025 | Watanabe | G01L 1/2287 |
| 2004/0000195 A1* | 1/2004 | Yanai | A61B 5/113 |
| | | | 73/717 |
| 2012/0137787 A1* | 6/2012 | Yao | G01L 1/16 |
| | | | 29/25.35 |
| 2015/0205481 A1 | 7/2015 | Severac et al. | |

OTHER PUBLICATIONS

Gräbner Daniel et al, "Screen-Printed Resistive Pressure Sensors: Influence of Electrode Geometry on the Performance and on Cross-Sensitivity to Strain and Temperature", GB vol. {0} 1837, No. {0} 1.

Rivadeneyra Almudena et al, "A novel electrode structure compared with interdigitated electrodes as capacitive sensor", Sensors and Actuators B: Chemical, Elsevier BV, NL,vol. {0} 204, Aug. 12, 2014 (Aug. 12, 2014), p. 552-560.

* cited by examiner

MICROSENSOR WITH INTERDIGITATED ELECTRODES

RELATED APPLICATIONS

This application is a 371 applications of PCT/EP2022/086523 filed Dec. 17, 2022, which claims priority from French Patent Application No. 21 13933 filed Dec. 17, 2021 each of which is incorporated herein by reference in its entirety.

The invention relates to a microsensor using one or more assemblies of nanoparticles electrically connected to interdigitated electrodes.

TECHNICAL FIELD

The invention belongs to the field of ultrasensitive microsensors configured to measuring a physical quantity, in particular a force or a pressure on a functionalized surface, in particular, but not exclusively, on a transparent tactile surface such as a tablet or a smart phone screen.

BACKGROUND ART

Document WO2014/016429 describes a transparent tactile surface provided with a plurality of microgauges, capable of measuring a pressure applied to the surface and deposited according to a matrix pattern on the surface.

Each of the microgauges comprises a first and a second electrode in the form of a comb, each comb comprising a plurality of rectilinear teeth connected at one of their ends by a connection strip, the electrodes being juxtaposed in mirror symmetry, so that the teeth of each comb are interdigitated between the teeth of the other comb.

Assemblies of conductive or semiconductive nanoparticles in an insulating ligand are interspersed between each pair of teeth, one of the teeth of the pair belonging to the first electrode and the other to the second electrode.

Each set comprising a tooth of each electrode and an assembly of nanoparticles, makes a deformation or stress microgauge, so that if each comb electrode comprises N teeth, the resulting sensor comprises 2N−1 microgauges.

In particular, this type of sensor is produced and deposited on a surface by soft lithography techniques.

The multiplication of comb teeth advantageously makes it possible, for a sensor covering a given surface, to reduce the electrical resistance of said sensor compared to a sensor using an assembly of nanoparticles covering the same area but using only two electrodes, one at each end of the nanoparticle assembly.

Figure 1:
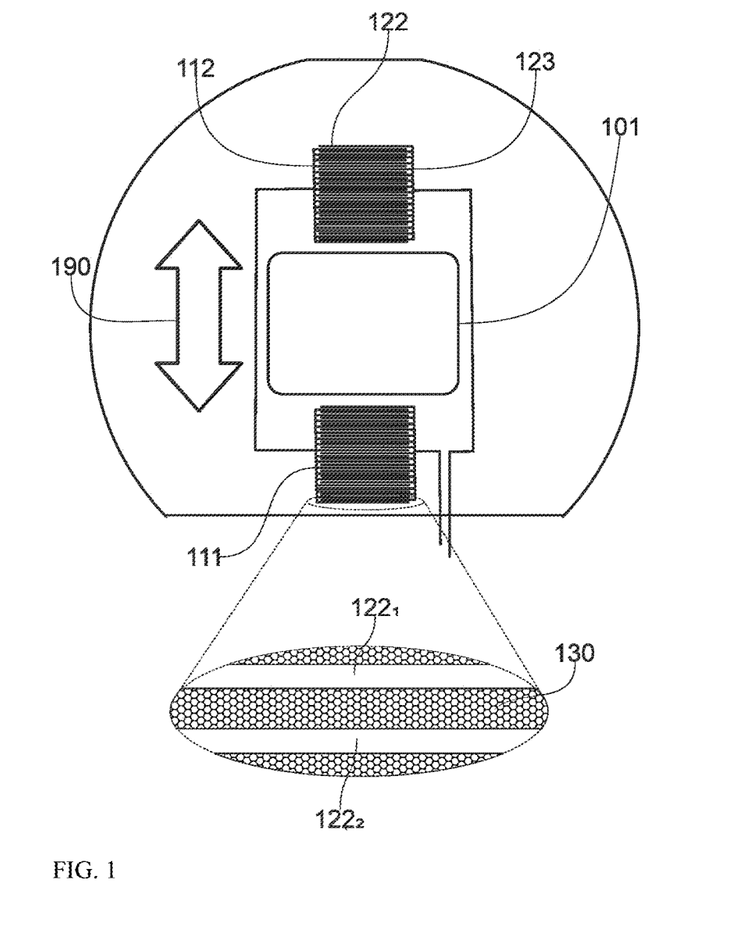
FIG. 1 relating to prior art, shows a top view of an exemplary embodiment of a sensor around a light shaft.

FIG. 1 shows an exemplary embodiment of such a sensor set around a "light shaft" (101) making a button type touch-sensitive surface showing a lighting return, for example a pictogram, on the area where an action (pressing) may be exerted.

According to this embodiment, two sensors (111, 112), mounted in series and comprising interdigitated comb electrodes, are placed on either side of the light shaft (101).

Each electrode of each sensor comprises a plurality of straight tracks (122), the tracks of a same electrode being connected to each other at one of their ends by strips (123).

In a detail view, nanoparticle assemblies (130) are placed between each pair of interdigitated tracks ($122_1$, $122_2$).

This technical solution is functional but causes a loss of sensitivity due to the serialization of the two sensors, and especially its response to a touch action is different if the touch pressure is applied at the center, in the light shaft (101), on one of the sensors, or on the sides of light shaft, given that the pressing area may vary from one user to another and even for the same user.

In addition, such type of sensor, given the locations of the nanoparticle assemblies (130) is more sensitive to stresses (190) applied perpendicular to the electrodes ($122_1$, $122_2$).

Thus, if any action is triggered in response to an applied pressure measured by such a device reaching a threshold, it is necessary to take into account these differences in response depending on the location of the touch, which is likely to lead to a certain loss of reliability.

SUMMARY OF THE INVENTION

The invention aims to solve the deficiencies set out above and for this purpose pertains to a microsensor comprising a first electrode and a second electrode, each electrode comprising a plurality of parallel tracks, each track comprising a connected end and a free end, each track extending from a strip, the strip connecting the tracks at their connected ends, the tracks of the two electrodes being offset and in mirror symmetry so that the tracks of the two electrodes are interdigitated and comprise between each pair of interdigitated tracks an assembly of nanoparticles in a ligand, wherein each track extending from the strip comprises at least one change of direction.

Thus, the sensor may be adapted to any type of contour.

The invention is advantageously implemented according to the embodiments and alternatives exposed hereafter, which are to be considered individually or according to any technically operative combination.

According to an advantageous embodiment, the plurality of tracks of each electrode comprises tracks extending from the strip in opposite directions. This embodiment allows a denser coverage of the measuring surface.

According to some embodiment, the tracks follow an outline around a central shape. This embodiment is particularly suitable for the installation of such a sensor around a light shaft.

Advantageously, the tracks extend from the strip along an angular trajectory covering 270°. This embodiment makes it possible to create a single sensor with a uniformity of sensitivity in all directions in the sensor plane.

According to an advantageous embodiment, the electrodes are made of tin doped indium oxide (ITO) and the nanoparticle assemblies are made of ITO in a phosphonic acid ligand. This embodiment makes it possible to make a transparent microsensor.

The invention also relates to a tactile surface comprising a substrate comprising a touch-sensitive area which area comprises a microsensor according to the invention, deposited on said substrate.

According to some embodiment the touch sensitive area comprises a light shaft and the microsensor is set around the light shaft.

According to a first variant, the substrate consists of an ethylene poly(terephthalate). This embodiment makes it possible to create a flexible tactile surface.

According to a second variant, the substrate is made of silicon dioxide, this embodiment allows the making of a rigid tactile surface.

According to a third variant, the substrate is a thin film made of polyimide. This embodiment makes it possible to create an ultra-flexible tactile surface capable of being assembled to a surface of any shape and any material, and to fit the shape of the surface.

BRIEF DESCRIPTION OF THE DRAWINGS

The invention may be implemented according to the preferred embodiments exposed hereafter, in no way limiting, with reference to FIG. 1 to FIG. 6 in which.

DESCRIPTION OF EMBODIMENTS

Figure 2:
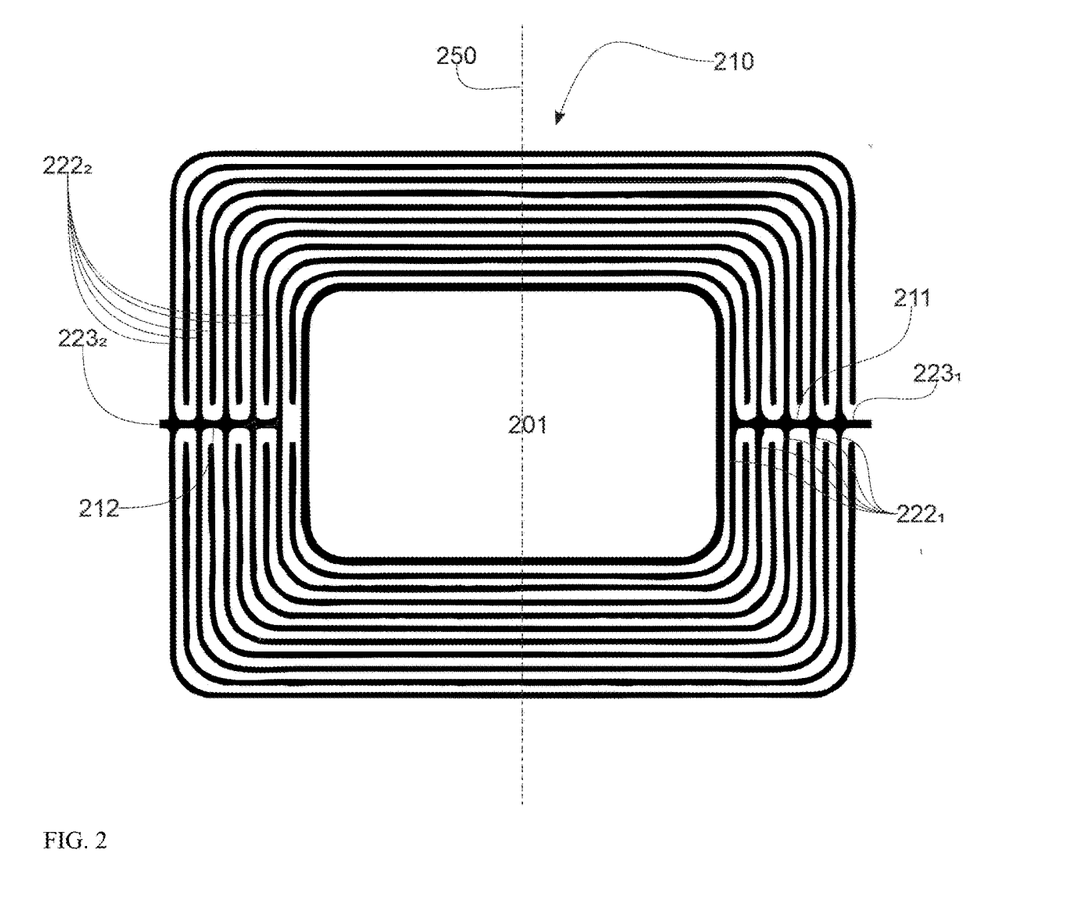
FIG. 2 shows a top view of an exemplary embodiment of a sensor according to the invention, set around a rectangular light shaft.

FIG. 2, according to an exemplary embodiment adapted to a functionalization of a surface around a light shaft (201), the microsensor (210) of the invention comprises, according to this embodiment, two interdigitated electrodes (211, 212) surrounding the light shaft (201).

Each electrode comprises a connection strip ($223_1$, $223_2$) connecting the respective ends of the tracks ($222_1$, $222_2$) extending from said strips.

For each electrode (211, 212), the tracks extend from the strip, in an initial direction substantially perpendicular to the strip. For each strip, two sets of tracks extend on either side of the strip ($223_1$, $223_2$) in opposite directions.

Each electrode is designed according to the same principle, in mirror symmetry with respect to an axis of symmetry (250) perpendicular to the strips.

The microsensor of the invention is very small in thickness and may be deposited on a surface of any shape.

The tracks are made of an electrically conductive material such as gold, copper or tin-doped indium oxide, commonly referred to as ITO, the latter when the sensor is intended to be transparent. They are deposited on a substrate (not shown) by techniques known from prior art such as convective capillary deposition or soft lithography.

The same micro-printing techniques make it possible to deposit between each pair of consecutive tracks, one of the tracks belonging to the first electrode (211) and the other track belonging to the second electrode (212), an assembly of conductive or semiconductive nanoparticles in colloidal suspension in an insulating ligand.

As nonlimiting examples, nanoparticles are nanoparticles of gold, copper, zinc oxide or ITO, the ligand is for example based on phosphonic acid.

When a stress is applied to such a microsensor either directly by pressing with a finger or a stylus on the sensor, or by a deformation imposed the substrate or a combination thereof, the distance between the nanoparticles is changed, which modifies the electrical conduction capacities between the nanoparticles suspended in the ligand through a tunneling effect. A measurement of a variation in conductivity or resistivity, via the electrodes, makes it possible to characterize this stress.

Thus, each assembly of nanoparticles between a pair of tracks constitutes a deformation microgauge and the microsensor integrates a plurality of microgauges connected in parallel, offering a high sensitivity and a high gauge factor.

The gauge factor of the microsensor is defined by the variation ΔR/R0 where R0 is the electrical resistance of the sensor without stress and ΔR the variation of this electrical resistance when the sensor is subjected to a given deformation.

Since the microgauges are connected in parallel, the electrical resistance of the sensor is reduced. Thus, the resistance R of a microsensor according to the invention comprising N elementary microgauges with a resistance $R_1 \ldots R_N$ is given by:

$$R = \frac{1}{\left(\frac{1}{R_1} + \frac{1}{R_2} + \ldots \frac{1}{R_N}\right)} \quad \text{[Math 1]}$$

Figure 3:
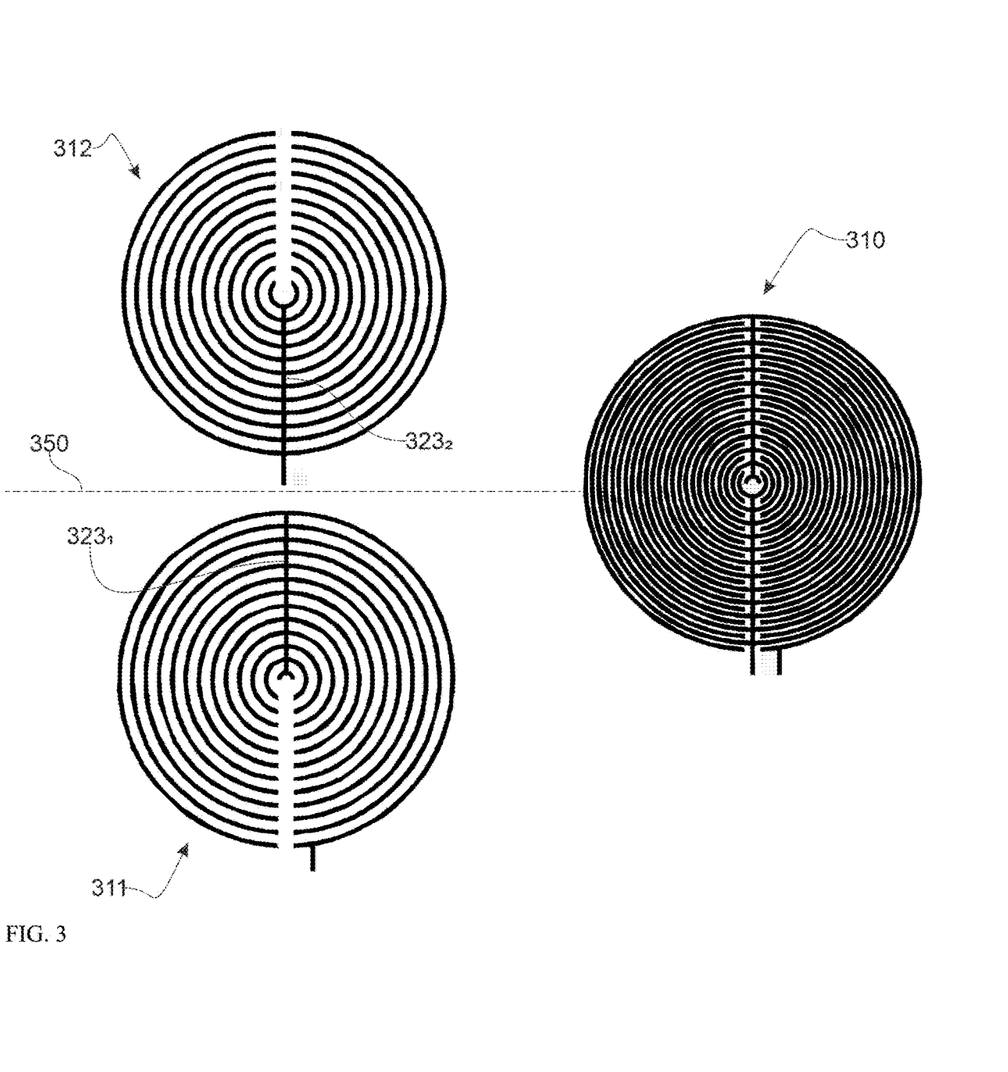
FIG. 3 represents, in a top view, an exemplary embodiment of a circular microsensor according to the invention, the two tracks being shown separately and then nested into each other as they appear on the sensor.

FIG. 3 the microsensor of the invention is not limited to a shape surrounding a light shaft. Thus, according to this exemplary embodiment, the microsensor (310) comprises a first electrode (311) comprising a plurality of tracks extending on circular paths of the order of 180° on either side of the connection strip ($323_1$) and a second electrode (312) of similar design in mirror symmetry along an axis (350) perpendicular to the strips ($323_1$, $323_2$) of the electrodes, with staggering of the tracks so as for them to be interspersed with respect to one another and to form the microsensor (310).

FIG. 3 shows the two electrodes (311, 312) of the sensor separately but the person skilled in the art understands that these two electrodes are directly printed, nested/interdigitated in each other.

Assemblies of nanoparticles (not shown) are, in the same way, deposited between the pairs of tracks so as to constitute as many elementary microgauges.

The sensor (310) thus obtained, fully covers a circular surface and has a sensitivity substantially equivalent in all directions parallel to the surface of the sensor.

Figure 4:
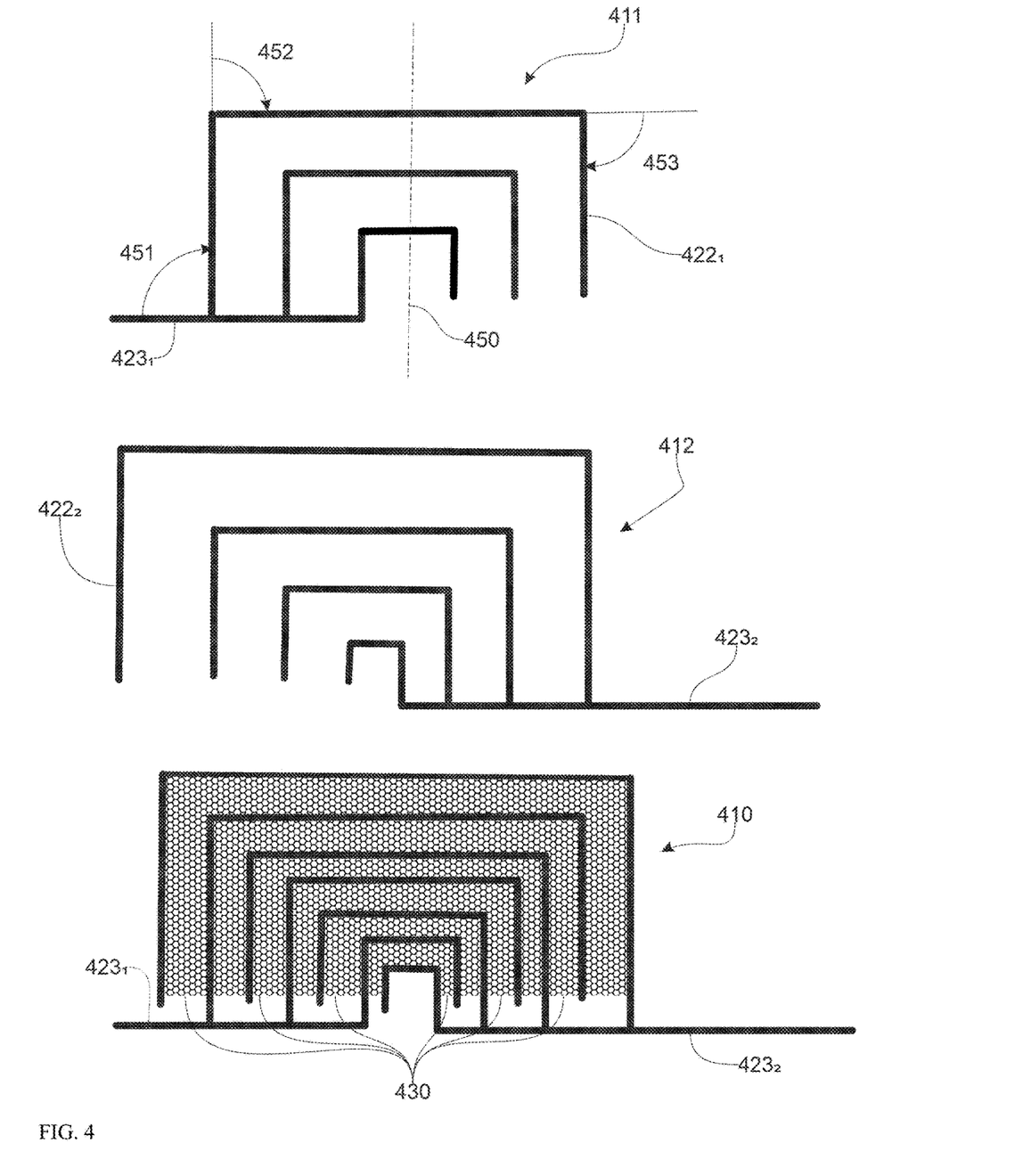
FIG. 4 is a top view of an exemplary embodiment, showing the design principle of the tracks of a sensor according to the invention, the two tracks being shown separately and then nested into each other as they appear on the sensor.

FIG. 4, according to some embodiment, the microsensor (410) of the invention comprises two electrodes (411, 412). Each electrode comprises a connection strip (423) and at least one track ($422_1$) departing from said strip in a first angular direction (451).

The track extends along a path comprising at least a second (452) and a third angular orientation (453) so that a sum of the said angular orientations, starting from the strip, is substantially equal to 270° so that the free end of the track is, in orientation, substantially perpendicular to the strip ($423_1$).

The second electrode (412) is substantially in mirror symmetry with the first (411) along an axis (450) perpendicular to the strip ($423_2$) and comprises at least one track ($422_2$) offset with respect to the track ($422_1$) of the first electrode, so as to create a space of substantially constant width between the two tracks. Assemblies of nanoparticles (430) are deposited sin the space so as to make microgauges.

According to this embodiment, the tracks comprise several straight portions oriented at angles (451, 452, 453)

relative to each other, the person skilled in the art understands that the same principles apply to circular tracks, such as FIG. 3, elliptical or composite, comprising progressive changes in orientation.

Figure 5:
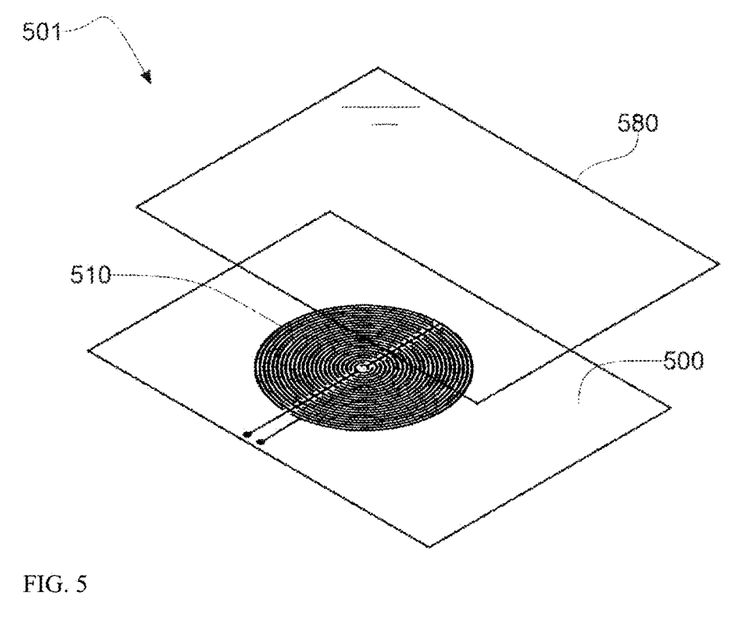
FIG. 5 shows, according to an exploded perspective view, an exemplary embodiment of a tactile surface integrating a microsensor according to the invention.

FIG. 5, to make a tactile surface (501), one or more sensors (510), each comprising 2 electrodes and assemblies of nanoparticles in colloidal suspension in a ligand, are deposited on a substrate (500) by convective capillary deposition techniques, soft lithography techniques or combination thereof as described in document WO2014/016429.

According to nonlimiting embodiments, the substrate is rigid, for example made of silicon dioxide (SiO2) or flexible, for example made of a thin plate of polyethylene terephthalate (PET) or very flexible, for example made of a thin film of polyimide.

Advantageously, a passivation layer (580) is deposited on the set to protect it from moisture and more generally from external aggressions.

The passivation layer (580) is sized according to the material making it, so that it allows the transmission of mechanical stresses to the nanoparticle assemblies of the sensor. As nonlimiting examples, the passivation layer may be made of a polyimide, a silicon dioxide (SiO2) or silicon nitride (Si3N4).

According to some embodiment, the tactile surface deposited on a flexible substrate, such as a thin film of polyimide, may be attached, for example by bonding, to a surface of any kind, flexible or rigid, such as leather, wood, polycarbonate glass, flooring, or a textile, so as to functionalize this host surface and thus make it sensitive to touch.

Example

Figure 6:
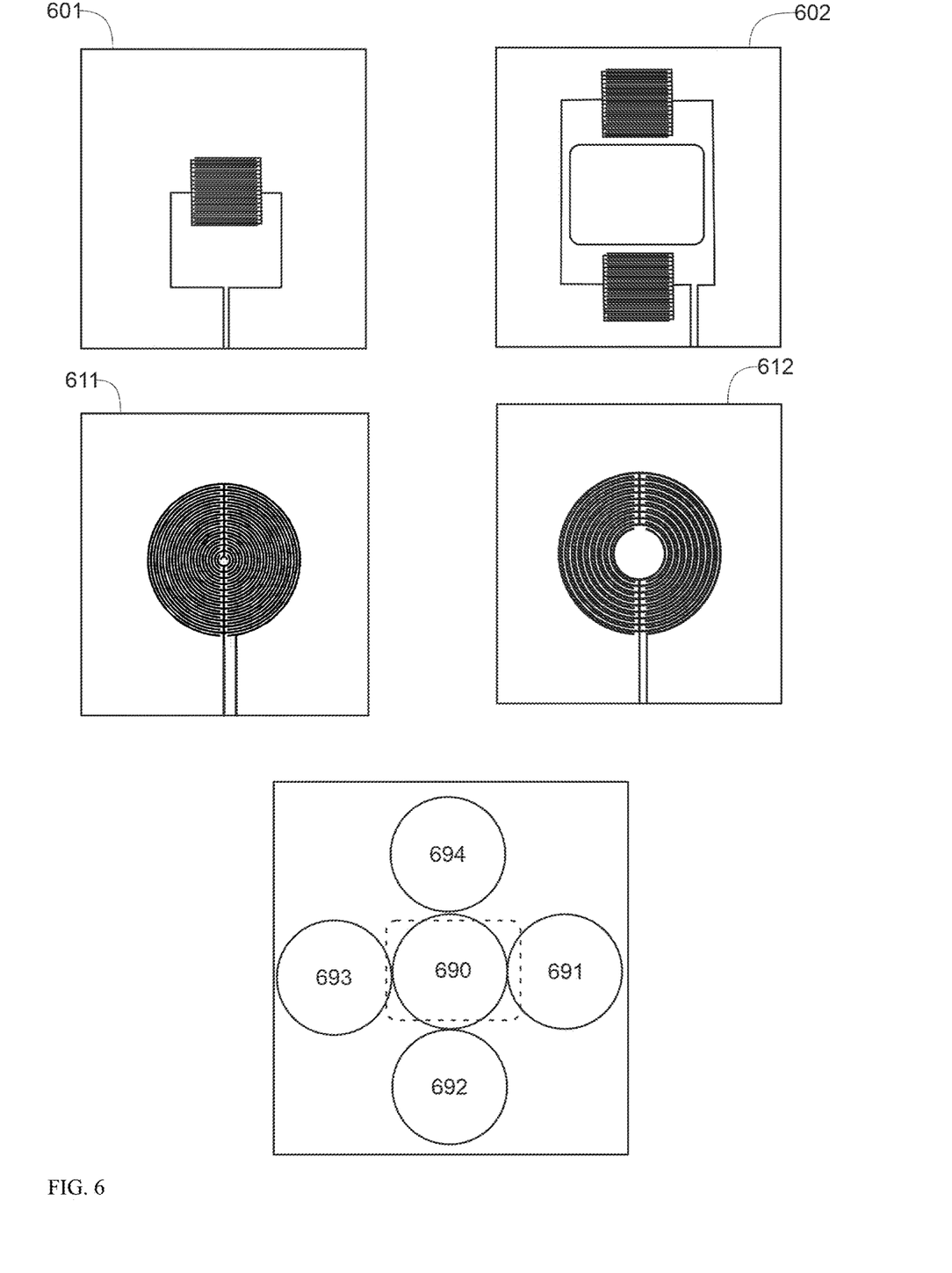
FIG. 6 shows the different configurations used to perform a test.

Four touch surfaces (601, 602, 611, 612) comprising microsensors are prepared by micro-printing of copper tracks on a polyimide substrate. They are then attached, on glass slides of 76×25×1 mm in dimensions, by bonding with a cyanolit glue.

The first touch surfaces (601, 602) comprise a 4×4 mm rectangular microsensor, respectively without (601) and with (602) a light shaft, made according to a design of the prior art, comprising nested comb-shaped rectilinear tracks and comprising in total 20 electrodes 100 micrometers wide and spaced apart by 100 micrometers. The electrical resistance of such a sensor is about 5000 ohms.

The second set of tactile surfaces (611, 612) uses the same substrate on which microsensors designed according to the principles of the invention are deposited by microprinting, respectively without (611) and with (612) a light shaft, with copper tracks.

The first (611) of the sensors (611, 612) of this second set of tactile surfaces is a circular sensor with a diameter of 20 mm comprising 44 electrodes, with a width of 100 micrometers and spaced apart by 100 micrometers. The second sensor (612) has the same characteristics as the first (611) but has a substantially circular light shaft 5 mm in diameter at its center.

For each of the glass slide, a force of the same intensity is applied by means of a stylus successively on 5 application points (690, 691, 692, 693, 694).

For each application of this force, the resistance variation of the sensor is measured and taken equal to 1 when the force is applied to the center (690).

The results are given in the following table:

TABLE 1

| Sensor | Location | | | | |
|---|---|---|---|---|---|
| | 690 | 691 | 692 | 693 | 694 |
| 601 | 1 | 0.6899 | 0.776 | 0.6107 | 0.7194 |
| 602 | 1 | 0.9012 | 0.9012 | 0.8047 | 0.8221 |
| 611 | 1 | 0.9641 | 1.012 | 0.8643 | 0.9242 |
| 612 | 1 | 1.0069 | 1.0152 | 1.0014 | 1.0193 |

The above results show that the microsensor of the invention produces results that are more homogeneous and less sensitive to the relative location of the force application with respect to the sensor, particularly when the sensor is associated with a light shaft.

The results and exemplary embodiments described above show that the invention achieves the intended purpose and that the design principles of the microsensor object of invention make it possible to obtain a sensor of high sensitivity capable of functionalizing any surface to make it tactile, alone or in combination with several sensors of this nature and remains efficient when the touch zones are associated with light shafts.

The invention claimed is:

1. A touch-sensitive surface comprising a substrate having a touch-sensitive area comprising a light shaft and microsensor deposited on the substrate and arranged around the light shaft, the microsensor comprising electrodes consisting in a first electrode and a second electrode;
    the first electrode consists in a first connecting strip and a first number of multiple parallel tracks extending from the first connecting strip to a plurality of free ends around the light shaft over at least 270° angle, the first number being more than 2;
    the second electrode consists in a second connecting strip and a second number of multiple parallel tracks extending from the second connecting strip to a plurality of free ends around the light shaft over at least 270° angle, the second number being equal or higher than the first number;
    the first number of multiple parallel tracks and the second number of multiple parallel tracks being offset and in mirror symmetry so that the first electrode and the second electrode are interdigitated;
    wherein spaces extending around the light shaft, each space being comprised between two consecutive tracks of the first electrode and the second electrode, one of the two consecutive tracks being a track of the first number of multiple parallel tracks and the other one of the two consecutive tracks being a track of the second number of multiple parallel tracks, comprise an assembly of nanoparticles in a ligand.

2. The touch-sensitive surface of claim 1, wherein the substrate is selected among an ethylene poly(terephthalate), a silicon dioxide and a polyimide film.

3. The touch-sensitive surface of claim 1, wherein the first electrode and the second electrode are made of tin doped indium oxide, and the nanoparticle assemblies are made of tin doped indium oxide nanoparticles in a phosphonic acid ligand.

* * * * *